United States Patent
Hwang et al.

(10) Patent No.: US 12,410,341 B2
(45) Date of Patent: Sep. 9, 2025

(54) ADHESIVE COMPOSITION, AND METHOD FOR PREPARING SAME

(71) Applicant: CJ CHEILJEDANG CORPORATION, Seoul (KR)

(72) Inventors: Ji Ho Hwang, Seoul (KR); Young Lyeol Yang, Seoul (KR); Kyung Su Na, Suwon-si (KR); Jun Ok Moon, Yongin-si (KR); Chang Suk Lee, Yongin-si (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 1134 days.

(21) Appl. No.: 17/253,681

(22) PCT Filed: Aug. 30, 2019

(86) PCT No.: PCT/KR2019/011177
§ 371 (c)(1),
(2) Date: Dec. 18, 2020

(87) PCT Pub. No.: WO2020/046055
PCT Pub. Date: Mar. 5, 2020

(65) Prior Publication Data
US 2021/0189180 A1   Jun. 24, 2021

(30) Foreign Application Priority Data

Aug. 31, 2018 (KR) ................ 10-2018-0104018
Aug. 27, 2019 (KR) ................ 10-2019-0105001

(51) Int. Cl.
| | | |
|---|---|---|
| C09J 4/00 | (2006.01) | |
| C08K 5/053 | (2006.01) | |
| C08K 5/092 | (2006.01) | |
| C08K 5/17 | (2006.01) | |

(52) U.S. Cl.
CPC ........... *C09J 4/00* (2013.01); *C08K 5/053* (2013.01); *C08K 5/092* (2013.01); *C08K 5/175* (2013.01); *C09J 2301/30* (2020.08)

(58) Field of Classification Search
None
See application file for complete search history.

(56) References Cited

U.S. PATENT DOCUMENTS

| | | | |
|---|---|---|---|
| 4,959,412 A | 9/1990 | Arter et al. | |
| 6,114,310 A * | 9/2000 | Chamberland | C07K 5/06086 514/1.2 |
| 6,245,746 B1 * | 6/2001 | Chamberland | C07K 5/06086 514/23 |
| 6,777,465 B2 | 8/2004 | Haile | |
| 7,306,844 B2 | 12/2007 | Chu et al. | |
| 7,939,145 B2 | 5/2011 | Dronzek, Jr. | |
| 9,238,761 B2 | 1/2016 | Omura | |
| 9,308,157 B2 * | 4/2016 | Takino | A61K 8/498 |
| 9,959,985 B2 | 5/2018 | Ichinomiya et al. | |
| 11,332,577 B2 | 5/2022 | Hampson et al. | |
| 2003/0064178 A1 | 4/2003 | Smith et al. | |
| 2006/0035007 A1 * | 2/2006 | Kawabe | A23L 2/66 426/648 |
| 2008/0015386 A1 * | 1/2008 | Murata | C07C 229/26 562/561 |
| 2011/0044914 A1 | 2/2011 | Rajnish et al. | |
| 2012/0122820 A1 * | 5/2012 | Diedrichs | A61P 7/02 514/342 |
| 2014/0271510 A1 * | 9/2014 | Takino | A61K 8/602 424/62 |

FOREIGN PATENT DOCUMENTS

| | | |
|---|---|---|
| CN | 1266080 A | 9/2000 |
| CN | 102274166 A | 12/2011 |
| CN | 104583333 A | 4/2015 |
| CN | 106661418 A | 5/2017 |
| EP | 0196844 B1 | 10/1986 |
| EP | 1568286 A1 | 8/2005 |
| EP | 1767521 A1 | 3/2007 |
| JP | 2014074092 A | 4/2014 |
| JP | 2014105331 A | 6/2014 |
| JP | 5959867 A | 8/2016 |
| KR | 1020070104446 A | 10/2007 |
| KR | 100989942 A | 10/2010 |
| KR | 1020110050851 A | 5/2011 |
| KR | 1020150142148 A | 12/2015 |

(Continued)

OTHER PUBLICATIONS

English Abstract of CA 1278132 C.
English Abstract of JP 2013-032482.
English Abstract of JP 2014-074092.
English Abstract of JP 2014-105331.
English Abstract of KR 10-2007-0104446.
English Abstract of KR 10-2011-0050851.
English Abstract of KR 10-2015-0142148.

(Continued)

*Primary Examiner* — Joseph D Anthony
(74) *Attorney, Agent, or Firm* — CANTOR COLBURN LLP

(57) ABSTRACT

Provided is an adhesive composition including ornithine, citric acid, and water, wherein the ornithine and the citric acid are present in the form of an aqueous salt solution and do not form precipitates in the aqueous solution. Also provided a method of preparing an adhesive composition including: mixing ornithine, citric acid, and water to form a mixture of the ornithine, the citric acid, and the water; and stirring the mixture at a temperature of less than 80° C., wherein respective contents of the ornithine, the citric acid, and the water are adjusted such that precipitates of the ornithine and the citric acid do not form in the adhesive composition.

12 Claims, No Drawings

(56) References Cited

FOREIGN PATENT DOCUMENTS

| KR | 1020160095132 A | 8/2016 |
| --- | --- | --- |
| RU | 2441641 C1 | 2/2009 |
| WO | 2007120653 A1 | 10/2007 |
| WO | 2010071298 A2 | 6/2010 |
| WO | 2011136568 A2 | 11/2011 |
| WO | 2015086545 A1 | 6/2015 |

OTHER PUBLICATIONS

NOA issued in KR 10-2019-0105001, dated Nov. 16, 2020.
Office Action issued in KR 10-2019-0105001, dated Jul. 28, 2020.
English Translation of International Search Report issued in PCT/KR2019/011177 dated Nov. 28, 2019.
English Translation of Office Action dated May 24, 2021, issued in RU Patent Application No. 2020142593.
English Translation of Search Report issued in RU Patent Application No. 2020142593, dated Aug. 30, 2019.
Office Action dated Jul. 27, 2021, issued in corresponding AU Patent Application No. 2019331348, 4 pp.
English Abstract of CN 102274166.
Extended European Search Report issued in EP Patent Application No. 19853502.3, dated Jan. 26, 2022, 7 pp.
English Abstract of CN 1266080 A.
English Language translation of Office Action issued Apr. 24, 2022, in corresponding CN Patent Application No. 201980040081.9, 5 pp.
Office Action issued Apr. 24, 2022, in corresponding CN Patent Application No. 201980040081.9, 5 pp.

* cited by examiner

ADHESIVE COMPOSITION, AND METHOD FOR PREPARING SAME

This application is a national stage application of PCT/KR2019/011177, filed Aug. 30, 2019, which claims priority to Korean Patent Application No. 10-2018-0104018 filed on Aug. 31, 2018, and Korean Patent Application No. 10-2019-0105001 filed on Aug. 27, 2019, both of which are hereby incorporated by reference in their entirety.

BACKGROUND

One or more embodiments relate to a novel adhesive composition and a method of preparing the same.

BACKGROUND ART

In general, adhesives include a petroleum-derived monomer and an oil-based solvent as raw materials. Monomers made from petroleum-derived raw materials and adhesives made from such monomers may have problems such as decreases in production due to limited oil reserves, generation of endocrine-disrupting chemicals during production of the monomers and adhesives, and toxicity caused by disposal of the monomers and adhesives. In particular, since organic solvents derived from petroleum are used during manufacturing processes of conventional adhesives in order to improve the adhesive strength of the manufactured adhesives, the health of workers is threatened and there is growing concern about environmental pollution. In addition, since most of the adhesives include monomer units covalently bonded to each other, natural decomposition of the adhesives is difficult and undecomposed polymers may cause environmental pollution. Therefore, for the efficient removal of adhesives from adherends, various water-removable adhesives have been developed. In order to efficiently remove conventional water-removable adhesives from adherends and substrates, high-temperature and alkaline conditions are required, and additional energy needs to be consumed. In addition, secondary environmental pollution may be caused by the release of raw material molecules of the adhesives into the environment when the adhesives attached to adherends or substrates are removed by water.

DESCRIPTION OF EMBODIMENTS

Technical Problem

One or more embodiments include an adhesive composition.

One or more embodiments include a method of preparing the adhesive composition.

Solution to Problem

Hereinafter, an adhesive composition, a method of preparing the same, and an adhesive product including the same according to an embodiment will be described in detail.

An adhesive composition including ornithine, citric acid, and water, wherein the ornithine and the citric acid are present in the form of an aqueous salt solution and do not form precipitates in the adhesive composition is provided.

Throughout the specification, the term "adhesion" refers to a phenomenon in which two objects (except for gases) are close to each other and a force (or work) is required to separate the two objects by pulling thereafter. If required, some materials having adhesion may be solidified after a given period of time after being applied to a substrate. When such an adhesive is separated from the substrate, irreversible physical destruction may occur. In addition, the term "adhesion" may include "viscoelasticity" which requires a force on viscoelastic deformation when the adhesive material is separated from the substrate. An adhesive composition having viscoelastic properties may be stored and distributed after pretreatment before being applied to the substrate. Thus, adhesive forces thereof may be maintained after a certain period of time. Examples of adhesive articles prepared by applying the adhesive composition to a substrate and drying the composition may include labels and oriented polypropylene (OPP) tapes. By using the adhesive properties, reversible attachment and detachment may be possible. By applying the adhesive composition to the substrate and drying the composition, an adhesive layer having viscoelasticity is formed on the substrate.

Meanwhile, viscosity refers to a property of inhibiting a flow of a substance caused by internal friction between molecules. In this case, friction is a force to prevent a difference in the distribution of flow velocities. Adhesion and viscosity are independent properties. A composition having a high viscosity may have a very low adhesion and a composition having a low viscosity may have a high adhesion.

Throughout the specification, the precipitates may include a water-insoluble salt AB(s) obtained via chemical changes of an aqueous solution of ornithine A(aq) and an aqueous solution of citric acid B(aq) as shown in Reaction Scheme 1 below, a solid of ornithine A(s) or a solid of citric acid B(s) precipitated in the aqueous solution of ornithine A(aq) or the aqueous solution of citric acid B(aq) as shown in Reaction Scheme 2 below, and a solid of ornithine A(s) or citric acid B(s) not dissolved in a solvent but remaining in an insoluble state.

$A(\text{aq}) + B(\text{aq}) \rightarrow AB(\text{s})$      Reaction Scheme 1

$A(\text{aq}) \rightarrow A(\text{s})$      Reaction Scheme 2

Also, the "precipitates" used herein may refer to precipitates formed before the adhesive composition is applied to the substrate or adherend or during storage and distribution of the adhesive composition.

As used herein, the term "ornithine" refers to a basic α-amino acid and ornithine may be biosynthesized from oxaloacetic acid via an ornithine biosynthetic pathway or chemically synthesized.

Ornithine may include one type of ornithine or a mixture of at least two types of ornithine.

Ornithine may include at least one of L-ornithine represented by Formula 1 below, D-ornithine represented by Formula 2 below, and salts thereof.

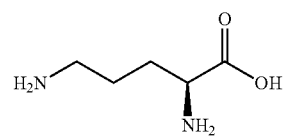

Formula 1

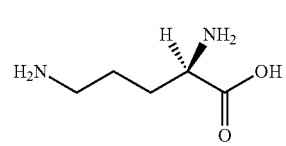

Formula 2

The ornithine salts may include, for example, ornithine sulfate, ornithine acetate, ornithine monohydrochloride, ornithine dihydrochloride, ornithine monohydrate, ornithine acetylsalicylate, ornithine phosphate, ornithine diphosphate, or a mixture or combination thereof. The ornithine salts may be converted into ornithine free forms.

Methods of converting ornithine salts into ornithine free forms are well known in the art. Also, commercially available ornithine raw materials may be used. For example, the ornithine may be D-ornithine, L-ornithine, and/or DL-ornithine. Since physicochemical properties thereof are the same or similar, characteristics of adhesive compositions including the same are also the same or similar, thereby being included in the scope of the present disclosure. According to an embodiment, ornithine may be obtained from a fermented broth.

Citric acid is an organic acid represented by Formula 3 below.

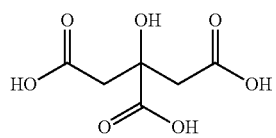

Formula 3

In the adhesive composition, ornithine and the citric acid may be present in the form of an aqueous salt solution. Specifically, although ornithine, citric acid, and water are mixed, ornithine and the citric acid may be present in the form of an aqueous salt solution without forming a covalent compound or an insoluble salt. According to the present disclosure, citric acid is not present in a water-insoluble form in the adhesive composition.

In the adhesive composition according to an embodiment, the respective contents of ornithine, citric acid, and water may be adjusted such that ornithine and citric acid do not form crystals or precipitates. When the adhesive composition is maintained in a liquid phase without forming crystals or precipitates, the adhesive composition may have excellent adhesion and may be uniformly applied to the substrate.

A mixing molar ratio of ornithine to citric acid may be in the range of 1.8:1 to 1:3. For example, the mixing molar ratio of ornithine to citric acid may be in the range of 1.7:1 to 1:3, 1.6:1 to 1:3, 1.5:1 to 1:3, 1.5:1 to 1:2, or 1.5:1 to 1:1. When the content of ornithine to that of citric acid is more than or less than the ranges described above, precipitates are formed in the composition, resulting in deterioration of adhesion, storage stability, or preservation stability.

A solid content of the adhesive composition may be equal to or less than 70 parts by weight, for example, in the range of 0.1 parts by weight to 70 parts by weight, 1 part by weight to 70 parts by weight, or 10 parts by weight to 70 parts by weight based on 100 parts by weight of the composition. When the solid content is within the ranges described above, the adhesive composition may be easily applied to the substrate. When the solid content is greater than 70 parts by weight, the composition cannot be used as an adhesive composition due to formation of precipitates in the adhesive composition. Although the solid content decreases, the adhesive composition does not precipitate or lose the adhesive force. Thus, the solid content may be adjusted in the range of 0.1 parts by weight to 10 parts by weight.

Citric acid and ornithine may be included in the adhesive composition as active ingredients. A sum of the contents of citric acid and ornithine may be in the range of 60 parts by weight to 100 parts by weight, 70 parts by weight to 99 parts by weight, 80 parts by weight to 98 parts by weight, or 85 parts by weight to 97 parts by weight based on 100 parts by weight of the solid content of the adhesive composition.

The adhesive composition according to an embodiment may further include an organic acid selected from itaconic acid, oxaloacetic acid, alpha-ketoglutaric acid, and malic acid, as a minor component, in addition to ornithine and citric acid. In this regard, the content of the organic acid may be in the range of 0.1 parts by weight to 10 parts by weight, for example, 0.1 parts by weight to 5 parts by weight, based on 100 parts by weight of citric acid. When the adhesive composition further includes an organic acid selected from itaconic acid, oxoacetic acid, alpha-ketoglutaric acid, and malic acid as described above, the adhesive force of the adhesive composition may easily be adjusted for various uses.

According to another aspect, citric acid and ornithine may be included in the form of a condensate including citric acid and ornithine as units. For example, the condensate may be a dimer, a trimer, or an oligomer. The content of the condensate may be equal to or less than 20 parts by weight, equal to or less than 10 parts by weight, or equal to or less than 1 part by weight, including 0, based on 100 parts by weight of the sum of the contents of ornithine and citric acid. When the content of the condensate is greater than the ranges described above, the adhesive force of the adhesive composition may decrease or the adhesive composition may not be maintained in the liquid phase.

The effects of the adhesive composition according to an embodiment on adhesion as described above will be described as follows. These effects are not to be construed as being limited to those described below and may also be explained by other effects within the scope of no scientific contradiction.

Ornithine has two amino groups and citric acid has two carbonyl groups. An unshared electron pair of oxygen of a carbonyl group of citric acid may interact with hydrogen of an amino group of ornithine via an ionic hydrogen bond.

Thus, when components of the adhesive composition according to an embodiment are analyzed by liquid chromatography or the like, ornithine and citric acid may be identified as raw materials. Thus, it may be confirmed that ornithine and the citric acid are bonded via an ionic hydrogen bond in the adhesive composition and are present in the form of an aqueous salt solution, respectively. In the adhesive composition according to an embodiment, ornithine and citric acid may have excellent adhesive properties while being maintained in a liquid phase at room temperature (25° C.) without forming crystals (solid state) or precipitates.

The adhesive composition according to the present disclosure has water removability. Thus, when the adhesive composition according to the present disclosure is used as an adhesive, the adhesive is dissociated, by water, from the substrate or adherend to which the adhesive is applied, and thereby easily separated and removed therefrom. Particularly, the adhesive applied to the substrate or adherend may be dissociated within 12 hours, particularly, within 6 hours, or more particularly, within 2 hours, at room temperature (25° C.) by a stirring or washing process using water. The adhesive composition according to an embodiment is easily dissociated by water and dissociated components are also environmentally friendly since they are not harmful to living organisms and the environment.

The adhesive composition according to the present disclosure may further include at least one alcohol solvent selected from a primary alcohol, a polyhydric alcohol, a diol, and a triol. When a solvent is further added to the adhesive composition, a drying rate of the adhesive composition may be increased and processability of the adhesive composition may be improved.

A mixing weight ratio of deionized water to alcohol in the adhesive composition according to an embodiment may be in the range of 1:1 to 10:0. More particularly, the mixing weight ratio of deionized water to alcohol in the adhesive composition may be in the range of 1:1 to 10:1, 1:1 to 5:1, or 1:1 to 3:2. As the content of alcohol increases in the adhesive composition, the adhesive composition is more efficiently dried and more easily coated, resulting in an increase in peel strength. However, when the content of alcohol is 1.5 times or more than that of deionized water in the adhesive composition, phase separation may occur in the adhesive composition.

The alcohol solvent may be a monohydric alcohol, a polyhydric alcohol, an unsaturated aliphatic alcohol, an alicyclic alcohol, or any mixture thereof. The monohydric alcohol may include at least one selected from methanol, ethanol, propane-2-ol, butane-1-ol, pentane-1-ol, and hexadecane-1-ol. The polyhydric alcohol may include at least one selected from ethane-1,2-diol, propane-1,2-diol, propane-1,2,3-triol, butane-1,3-diol, butane-1,2,3,4-tetraol, pentane-1,2,3,4,5-pentol, hexane-1,2,3,4,5,6-hexol, and heptane-1,2,3,4,5,6,7-heptol.

The unsaturated aliphatic alcohol may include at least one selected from, for example, prop-2-en-1-ol, 3,7-dimethyl-octa-2,6-dien-1-ol, and prop-2-yn-1-ol.

The alicyclic alcohol may include at least one selected from cyclohexane-1,2,3,4,5,6-hexol and 2-(2-propyl)-5-methyl-cyclohexane-1-ol. The pH of the adhesive composition may be in the range of 2 to 11, particularly, 2 to 9.5, and more particularly 2 to 8.5. An adhesive composition having the pH within the ranges described above has excellent storage stability and preservation stability without changing formulation or quality even after a long term storage. The adhesive composition may have excellent adhesion without forming precipitates when used not only immediately after production but also after a long term storage.

Particularly, the adhesive composition may be a composition in which precipitates are not formed after being stored or distributed for 14 days or more. For example, since the adhesive composition is stable, physical properties thereof may be maintained after being stored for 14 days or more, for example, 12 months or more. Also, a temperature of an environment in which the adhesive composition is stored may be in the range of −18° C. or higher and less than 80° C., particularly, in the range of −18° C. to 45° C., 0° C. to 60° C., or 20° C. to 40° C. Although the adhesive composition is stored at a low temperature or a high temperature, the formulation and quality of the adhesive composition may not be affected by temperature as long as a temperature of an environment in which the adhesive composition is used is room temperature. For example, when the adhesive composition is stored at a low temperature, the adhesive composition may be used after being maintained at room temperature for a predetermined time before use.

According to another aspect of the present disclosure, a method of preparing the adhesive composition including mixing ornithine, citric acid, and water and stirring the mixture at a temperature of less than 80° C. is provided.

When the mixing of ornithine, citric acid, and water and stirring the mixture at a temperature of less than 80° C. is performed out of the temperature range, side reaction products, impurities, and the like may be produced. In some cases, it may be difficult to obtain an adhesive composition having desired adhesion.

The stirring of the mixture at a temperature of less than 80° C. may be performed, for example, at a temperature of 0° C. or higher and less than 80° C. More particularly, this step may be performed at a temperature of 0° C. to 75° C., 0° C. to 70° C., 0° C. to 65° C., or 0° C. to 60° C.

For example, the stirring of the mixture at a temperature of less than 80° C. may include i) a first step of mixing and stirring at a temperature of 0° C. or higher and less than 80° C., 0° C. to 75° C., 0° C. to 70° C., or 0° C. to 60° C. and ii) a second step of cooling to room temperature (20° C. to 30° C.). The mixing of ornithine, citric acid, and water may be performed by adding citric acid to an aqueous solution of ornithine or by simultaneously mixing ornithine, citric acid, and water.

The method may further include removing water and the solvent by concentration under reduced pressure to control the solid content of the adhesive composition to a predetermined range.

According to another aspect of the present disclosure, an adhesive product including the adhesive composition applied to the substrate is provided. The adhesive product may include: a substrate; and an adhesive layer obtained by applying the adhesive composition to the substrate and drying the adhesive composition. The solvent included in the composition may be removed by drying. The drying may be performed at a temperature of 25° C. to 45° C.

The substrate may be any adherend commonly used in the art to which the adhesive composition is applicable. The substrate may be, for example, a glass substrate, a stainless steel (SUS) substrate, or a polymer film. As the polymer film, for example, a polyolefin-based film such as polyethylene, polypropylene, an ethylene/propylene copolymer, polybutene-1, an ethylene/vinyl acetate copolymer, or a polyethylene/styrene-butadiene rubber mixture, or a polyvinylchloride film may be generally used. In addition, a plastic material such as polyethylene terephthalate, polycarbonate, and poly(methyl methacrylate) or a thermoplastic elastomer such as polyurethane and a polyamide-polyol copolymer, and any mixture thereof may also be used.

The substrate may have an uneven surface to improve adhesive force between the substrate and the adhesive composition. According to another embodiment, the surface of the substrate may be hydrophilically treated. By using the hydrophilically treated substrate, the adhesive composition may be more uniformly coated on the hydrophilic substrate, thereby improving a film forming property.

When a glass substrate is used as the substrate, the adhesive composition may be more uniformly coated on glass having hydrophilicity, and thus the film forming property of the adhesive composition may be improved. When an SUS substrate used as the substrate, citric acid included in the adhesive composition induces interactions with the SUS, and thus adhesion between the substrate and an adhesive layer formed from the adhesive composition is improved.

According to another aspect of the present disclosure, provided is a method of attaching a first substrate to a second substrate including: applying the adhesive composition to the first substrate to bond the adhesive composition to the first substrate; and brining the first substrate to which the adhesive composition is bonded into contact with the second substrate to attach the first substrate to the second substrate.

The first substrate and the second substrate may be each independently selected from glass, stainless steel, polymer film, metal, plastic, paper, fiber, and soil, without being limited thereto. For example, the first substrate may be formed of the same material as that of the second substrate.

The adhesive composition according to the embodiment, as a water-removable adhesive, may be used as adhesive tapes, sheets for labels, spray-type adhesives, dust removers, or the like and may be easily removed from an adherend by using water without damaging the adherend, and packing materials may be easily recycled. In addition, when the adhesive composition or adhesive product is applied to pesticides and seeds, an application range thereof may be widened due to water-removable properties thereof. The water-removable adhesive according to the present disclosure may be manufactured with lower costs, more easily handled, and may have improved workability and cleanness of working environments in comparison with conventional organic solvent-type adhesives.

A bio-derived monomer may be selected as a starting material to prepare the adhesive composition according to the present disclosure. Since the bio-derived monomer may be used in living organisms, environmental pollutions caused by petroleum-derived monomers, polymers, or oligomers obtained when the adhesive is separated using water may be prevented in advance. Structures such as adhesive tapes and sheets for labels produced by using the adhesive composition according to the present disclosure as water-removable adhesives have improved mechanical strength such as tensile strength and peel strength.

According to another embodiment, the adhesive composition or adhesive product may further include at least one additive selected from a reactive diluent, an emulsifier, a tackifier, a plasticizer, a filler, an antiaging agent, a curing accelerator, a flame retardant, a coagulant, a surfactant, a thickener, an UV screening agent, an elastomer, a pigment, a dye, a flavoring agent, an antistatic agent, an antiblocking agent, a slip agent, an inorganic filler, a kneading agent, a stabilizer, a modifying resin, a coupling agent, a levelling agent, a fluorescent brightening agent, a dispersant, a thermal stabilizer, a photostabilizer, an UV absorbent, a wax, a humectant, an antioxidant, a preservative, and a lubricant. Although a total amount of the additives is not particularly limited, various additives may be included in various weight ranges according to the field of application. The above-described additives may be used in amounts commonly used in the art, respectively.

The reactive diluent is a diluent that helps each component of the composition is uniformly coated on an article to which the composition is applied, and may include at least one selected from n-butylglycidylether, aliphaticglycidylether, 2-ethylhexylglycidylether, phenylglycidylether, o-cresylglycidylether, nonylphenylglycidylether, p-tertbutylphenylglycidylether, 1,4-butanedioldiglycidylether, 1,6-hexanedioldiglycidylether, neopentylglycidylether, 1,4-cyclohexanedimethyloldiglycidylether, polypropyleneglycoldiglycidylether, ethyleneglycoldiglycidylether, polyethyleneglycoldiglycidylether, diethyleneglycoldiglycidylether, resorcinoldiglycidylether, hydrogenated bisphenol A glycidylether, trimethylolpropenetriglycidylether, glycerolpolyglycidylether, diglycerolpolyglycidylether, pentaerythritolpolyglycidylether, castor oil glycidylether, sorbitolpolyglycidylether, neodecanoic acid glycidylether, diglycidyl-1,2-cyclohexanedicarboxylate, diglycidyl-o-phthalate, N,N-diglycidylamine, N,N-diglycidyl-o-toluidine, triglycidyl-p-aminophenol, tetraglycidyl-diaminodiphenylmethane, triglycidyl-isocyanate, 1,4-butanedioldiglycidylether, 1,6-hexanedioldiglycidylether, polypropyleneglycidyldiglycidylether, and triethylolpropenetriglycidylether.

The emulsifier may include, for example, at least one selected from a polyoxyethylene-polyoxypropylene copolymer, a polyoxyethylene-polyoctylphenylether copolymer, and sodiumdodecylbenzenesulfide.

The tackifier may be, for example, a rosin and modified products thereof (e.g., rosin, hydrogenated rosin, polymerized rosin, maleated rosin, rosin glycerin, and rosin modified phenolic resin), a terpene-based resin (e.g., terpene resin, terpene-phenol resin, terpene-styrene resin, and terpene-phenolic resin), a petroleum resin (e.g., C5 petroleum resin, C9 resin, bicyclic nonadiene petroleum resin, hydrogenated petroleum resin, and styrene-terpene resin), a phenolic resin, a polymethylstyrene resin, a ketonealdehyde resin, a xylene formaldehyde resin, a Cashew oil modified phenolic resin, a Tall oil modified phenolic resin, a rubber, a resin emulsion (e.g., rosin emulsion, TPR water based resin, 2402 resin emulsion, and petroleum resin emulsion), a coumarone-indene resin, or the like.

The plasticizer may be included in the composition to improve processing flow or elongation. The plasticizer may also improve functions of the composition, such as electric insulation, adhesion, cold resistance, light resistance, oil resistance, resistance to saponification, flame retardancy, thermal stability, easy processability (intramolecular activity), activity (intermolecular activity), and non-toxicity.

A plasticizer to improve cold resistance may be dioctyl adipate (DOA), dioctyl azelate (DOZ), dioctyl sebacate (DOS), Flexol TOF (UCC company), polyethyleneglycol ester, or the like. A plasticizer to improve heat resistance (non-volatility) and non-transmutation may be a polymer blend such as polyester and nitrile-butadiene rubber (NBR), trimellitic ester, pentaerythritol ester, or the like. A plasticizer to improve light resistance may be DOP, DOA, DOS, polyester, epoxidized soybean oil (ESBO), or the like.

A plasticizer to improve oil resistance may be Phosflex aromatic phosphate ester (Product Name: TPP, TCP, 112 (CDP), and 179A (TXP)), polyester, NBR, or the like, and a plasticizer to improve resistance to saponification may be TCP, ESBO, polyester, or the like.

A plasticizer to improve flame retardancy may be phosphate such as TCP and TXP, chlorinated paraffin, chlorinated alkylstearate, NBR, or the like, and a plasticizer to improve thermal stability may be ESBO, DOZ, DOS, DOP, polyethyleneglycol ester, or the like.

A plasticizer to improve easy processability may be DOA, BBP, TOF, TCP, octyldiphenyl phosphate, and the like, and a plasticizer to improve activity may be DOZ, DOS, dibasic lead phosphate (DLP), ESBO, polyethyleneglycol ester, or the like.

A plasticizer for non-toxicity may be BPBG, octyldiphenyl phosphate, ESBO, citric acid ester, NBR, or the like.

More particularly, examples of the plasticizer may include dibutylphthalate (DBP), dihexylphthalate (DHP), di-2-ethylhexylphthalate (DOP), di-n-octylphthalate (DnOP), diisooctylphthalate (DIOP), didecylphthalate (DDP), diisodecylphthalate (DI DP), C8-C10 mixed higher alcohol phthalate, butylbenzyl phthalate (BBP), dioctyladipate (DOA), dioctylazelate (DOZ), dioctylsebacate (DOS), tricresyl phosphate (TCP), trixylenyl phosphate (TXP), monooctyldiphenylphosphate (Santicizer141), monobutyl-dixylenyl phosphate, trioctylphosphate (TOF), aromatic oil, polybutene, and paraffin.

As used herein, the thickener may be, for example, alginin, alginic acid, sodium alginate, guar gum, xanthan gum, collagen, alginate, gelatin, furcellaran, agar, carrageenan, casein, locust bean gum, pectin, polyethyleneoxide, polyethyleneglycol, polyvinylalcohol, polyvinylpyrrolidone, or the like.

The surfactant may be any surfactant commonly used in the art. For example, the surfactant may be C8-C18 alkyl sulfate, C8-C18 alkyl ether sulfate or C8-C18 alkyl aryl ether sulfate including 40 or less of ethylene oxide or propylene oxide units and a hydrophobic group, C8-C18 alkyl sulfonate, alkylaryl sulfonate, ester and semi-ester of sulfosuccinic acid including monohydric alcohol or alkylphenol, C8-C40 alkyl polyglycol ether or C8-C40 alkyl aryl polyglycol ether including ethylene oxide units, or the like. For example, sodium dodecyl sulfate (SDS), sodium-silicate, and the like may be used therefor.

The filler is added to improve strength, durability, and workability of the composition. Examples of the filler may include calcium carbonate, talc, ceramic, silica, dolomite, clay, titanium white, zinc oxide, carbon (preventing shrinkage or blocking), potassium carbonate, titanium oxide, liquid polysulfide polymer, volatile diluent, magnesium oxide, and processing oil.

The curing accelerator may be, for example, dibutyltin dilaurate, JCS-50 (Johoku Chemical Company Ltd.) or Formate TK-1 (Mitsui Chemical Polyurethane Corporation). The antioxidant may be, for example, dibutyl hydroxy toluene (BHT), IRGANOX® 1010, IRGANOX® 1035FF, or IRGANOX® 565 (all manufactured by Chiba Specialty Chemicals).

The antistatic agent is not particularly limited and examples thereof may include 1-hexyl-4-methylpyridinium hexafluorophosphate, dodecylpyridinium hexafluorophosphate, a fluorinated organometallic compound (e.g., HQ-115 of 3M Company), an alkali metal salt (e.g., $NaPF_6$, $NaSbF_6$, $KPF_6$, and $KSbF_6$), a conductive polymer (e.g., polythiophene (PEDOT of Bayer), polyaniline, and polypyrrole), a metal oxide (e.g., indium-doped tin oxide (ITO), antimony-doped tin oxide (ATO), tin oxide, zinc oxide, antimony oxide, and indium oxide), a quaternary ammonium salt (e.g., poly(acrylamide-co-diallyldimethyl ammonium chloride) solution of Sigma-Aldrich), 1-butyl-3-methylimidazolium hexafluorophosphate ([BMIM][$PF_6$]), 1-butyl-3-(2-hydroxyethyl)imidazolium bis(trifluoromethane sulfonyl)imide ([BHEIM][$NTf_2$]), and tetrabutylmethylammonium bis (trifluoromethanesulfonyl)imide ([TBMA][$NTf_2$]) which may be used alone or in combination of at least two thereof.

The elastomer refers to a rubber or a polymer having properties of an elastomer and may be, for example, an ethylene-vinylacetate copolymer, acrylic rubber, natural rubber, isoprene rubber, styrene butadiene rubber, chloroprene rubber, butyl rubber, ethylene propylene rubber, a styrene-ethylene-butylene-styrene copolymer, or an acrylonitrile-butadiene copolymer.

The stabilizer stabilizes the adhesive force of the adhesive composition or the like and examples thereof may include polyol and polyamine. For example, at least one selected from alkylene glycol, dialkylene glycol, benzenediol, benzenetriol, dialcoholamine, trialcoholamine, arabitol, mannitol, isomalt, glycerol, xylitol, sorbitol, maltitol, erythritol, ribitol, dulcitol, lactitol, threitol, iditol, polyglycitol, alkylene diamine, alkenylene diamine, phenylene diamine, and n-aminoalkylalkane diamine may be used therefor.

The fluorescent brightening agent may be a benzoxazole compound, a benzothiazole compound, a benzoimidazole compound, or the like.

The pigment may be a natural or synthetic pigment or an inorganic or organic pigment classified by another criterion.

The flavoring agent may be, for example, but is not limited to, peppermint oil, spearmint oil, carvone, or menthol, used alone or in combination.

The flame retardant may be melamine cyanurate, magnesium hydroxide, agalmatolite, zeolite, sodium silicate, aluminum hydroxide, antimony (antimony trioxide), or the like. An additive to improve water resistance may be glyoxal.

Examples of the modifying resin may include a polyol resin, a phenol resin, an acrylic resin, a polyester resin, a polyolefin resin, an epoxy resin, and an epoxidized polybutadiene resin.

The coupling agent may improve adhesion and adhesion reliability between the adhesive composition and a packaging material. If the coupling agent is added, adhesion reliability may be improved in the case where the composition is maintained under high-temperature and/or high-humidity conditions for a long period of time. Examples of the coupling agent may include a silane compound such as γ-glycidoxypropyl triethoxy silane, γ-glycidoxypropyl trimethoxy silane, γ-glycidoxypropyl methyldiethoxy silane, γ-glycidoxypropyl triethoxy silane, 3-mercaptopropyl trimethoxy silane, vinyltrimethoxysilane, vinyltriethoxy silane, γ-methacryloxypropyl trimethoxy silane, γ-methacryloxy propyl triethoxy silane, γ-aminopropyl trimethoxy silane, γ-aminopropyl triethoxy silane, 3-isocyanato propyl triethoxy silane, γ-acetoacetatepropyl trimethoxysilane, γ-acetoacetatepropyl triethoxy silane, β-cyanoacetyl trimethoxy silane, β-cyanoacetyl triethoxy silane, and acetoxyaceto trimethoxy silane.

The kneading agent may be an aromatic hydrocarbon resin.

The antiaging agent may be N-(1,3-dimethylbutyl)-N'-phenyl-p-phenylene diamine.

The humectant may be, for example, sugar, glycerin, a sorbitol aqueous solution, or an amorphous sorbitol aqueous solution, used alone or in combination.

The UV absorbent may be ethylhexyl methoxycinnamate (e.g., 2-ethylhexyl 4-methoxycinnamate), ethylhexyl salicylate, 4-methylbenzylidene camphor, isoamyl p-methoxycinnamate, octocrylene, phenylbenzimidazole sulfonic acid, homosalate, cinoxate, ethylhexyltriazone, polysilicone-15, TEA-salicylate, PABA, ethylhexyldimethyl PABA, glyceryl PABA, or the like. These compounds may be used alone or in combination of at least two thereof.

The adhesive composition or adhesive product according to the present disclosure may further include additives disclosed in U.S. Pat. No. 4,959,412, CA1278132, U.S. Pat. No. 6,777,465, WO2007-120653, US2003-0064178, U.S. Pat. Nos. 7,306,844, 7,939,145, WO2011-136568, WO2010-071298, Korean Patent Application Publication No. 2016-0095132, Japanese Patent Application Publication No. 5959867, and Korean Patent No. 989942, which are hereby incorporated by reference, in addition to the above-described additives.

The adhesive composition or adhesive product according to an embodiment may be used to attach labels or the like to various packing materials including metal, glass, and plastic. The packing materials may be, for example, containers for food, beverage, or household products, and these containers may be made of glass, metal, or plastic.

The adhesive composition or adhesive product may be used as adhesives, coating agents, carriers, food additives, or the like according to the composition and characteristics thereof.

When used as adhesives, the adhesive composition or adhesive product according to the present disclosure may be applied to labels, sealants, wallpaper, cigarette paper, adhesive block toys, sand sculptures, foods, bath/kitchen detergents, animal ointment sprays, exfoliation, hair fixation, hair gels, soil stabilizers, water glue, paper-strengthening agents, corrugated board, zone adhesives, and the like. The soil stabilizers are used to remove fine dusts such as sandy dusts or dusts generated in factories.

When used as coating agents, the adhesive composition or adhesive product according to the present disclosure may be applied to forest fire prevention, fruits and vegetables, truncated surfaces of flowers, dyes, antifouling pretreatment coating agents, and the like. In this case, for the antifouling pretreatment coating agents, when the composition is coated on an easily contaminated medium, contaminants may be simply removed therefrom by washing with water.

When used as carriers, the adhesive composition or adhesive product according to the present disclosure may be applied to forest protection against epidemics, forest fire prevention, air fresheners for bathrooms, disinfectants, agricultural materials, household products, toys, and the like. The forest protection against epidemics may be, for example, prevention of the spread of diseases such as pinewood nematode in forests, and the disinfectants may be, for example, avian influenza disinfectants and foot-and-mouth disease disinfectants. The agricultural materials may include fertilizers, taping materials, and seed coatings.

When used as agricultural materials, the adhesive composition or adhesive product according to the present disclosure may be applied to seed-coating agents, plant taping agents, insecticide additives, fertilizer excipients, natural pesticides, and the like. When used as household products, the adhesive composition according to the present disclosure may be added to paints to enhance adhesive forces thereof to paper without draining off or added to food colors to prepare edible paints used by toddlers. Another examples of household products, the adhesive composition may also be used as a decontamination pretreatment agent. More particularly, contaminants may be quickly removed by spraying the adhesive composition according to the present disclosure to contaminated media such as window screens, window frames, and automobiles and then washing the media with water.

When used as carriers, the adhesive composition or adhesive product according to the present disclosure may realize oxygen-blocking, moisture-blocking, oil-resistant, and heat-sealing functions. Thus, when used in coating layers of eco-friendly food packing materials, effects of preventing or delaying decay and oxidation of foods may be obtained while inhibiting infiltration of external moisture. Also, when used as food additives, the adhesive composition or adhesive product according to the present disclosure may be applied to wheat gluten substitutes, jellies, starch syrups, cookies, food colors, ice creams, and antifreeze substances.

Advantageous Effects of Disclosure

The adhesive composition according to an embodiment has functions of water-removable adhesives, coating agents, and carriers. When the adhesive composition is used as a water-removable adhesive, the adhesive composition may easily be dissociated from an adherend or a substrate by water to be easily removed therefrom. Thus, the adhesive is environmentally friendly as a water-removable material.

Mode of Disclosure

Hereinafter, one or more embodiments of the present disclosure will be described in detail with reference to the following examples. These examples are not intended to limit the purpose and scope of the one or more example embodiments of the present disclosure.

Example 1: Evaluation of Stability of Composition Including Ornithine and Various Organic Acids Ornithine, as a basic amino acid, and various organic acids were mixed to prepare compositions. Stability of each composition (whether precipitates were formed) was evaluated.

Method of Preparing Adhesive Composition Including Ornithine and Citric Acid:

86.5 g of distilled water (DIW) was added to 100 g of a 54 wt % aqueous solution of L-ornithine free form and the mixture was stirred at room temperature (25° C.) for 30 minutes to dilute ornithine. 78.50 g of citric acid (CA) was slowly added to the diluted ornithine while stirring for 1 hour at room temperature (25° C.), and then the mixture was stirred at room temperature (RT) for 1 hour. Subsequently, after the reaction mixture was cooled to room temperature (25° C.), the reaction was terminated to obtain 265 g of an adhesive composition. A solid content of this composition was about 50 parts by weight based on 100 parts by weight of the composition, a mixing molar ratio of ornithine to citric acid was 1:1, and deionized water was used as a solvent.

Compositions were prepared in the same manner as described above by using different types of organic acids. The compositions were prepared in the same manner as in Example 1, except that organic acids shown in Table 1 below were used, respectively.

TABLE 1

| No. | Acid | Ornithine:Acid (mol ratio) | Solvent | Solid content (parts by weight) |
|---|---|---|---|---|
| 1-1 | Citric acid | 1:1 | DIW | 50 |
| 1-2 | Acetic acid | 1:1 | | |
| 1-3 | Glutamic acid | 1:1 | | |
| 1-4 | Glutaric acid | 1:1 | | |
| 1-5 | Tartaric acid | 1:1 | | |
| 1-6 | Aspartic acid | 1:1 | | |
| 1-7 | Fumaric acid | 1:1 | | |
| 1-8 | Glyoxylic acid | 1:1 | | |
| 1-9 | 4-ketopimelic acid | 1:1 | | |
| 1-10 | Pyruvic acid | 1:1 | | |
| 1-11 | 1,3-acetonedicarboxylic acid | 1:1 | | |

Formation of precipitates in the compositions prepared according to Table 1 was evaluated. Particularly, each of the compositions was applied to an OPP film (Sam Young Chemical Co., Ltd.) having a thickness of 50 µm to a thickness of about 50 µm by using a bar coater. After the film coated with the composition was maintained at room temperature (25° C.) at a relative humidity of 60±10% for 14 days, surface change of each adhesive composition present on the OPP film were identified and morphological changes thereof were evaluated. Evaluation results are shown in Table 2 below.

TABLE 2

| No. | Acid | Ornithine:Acid (molar ratio) | Solvent | Solid content (parts by weight) | State |
|---|---|---|---|---|---|
| 1-1 | Citric acid | 1:1 | DIW | 50 | liquid state |
| 1-2 | Acetic acid | 1:1 | | | precipitates |
| 1-3 | Glutamic acid | 1:1 | | | precipitates |
| 1-4 | Glutaric acid | 1:1 | | | precipitates |
| 1-5 | Tartaric acid | 1:1 | | | precipitates |
| 1-6 | Aspartic acid | 1:1 | | | precipitates |
| 1-7 | Fumaric acid | 1:1 | | | precipitates |
| 1-8 | Glyoxylic acid | 1:1 | | | precipitates |
| 1-9 | 4-ketopimelic acid | 1:1 | | | precipitates |
| 1-10 | Pyruvic acid | 1:1 | | | precipitates |
| 1-11 | 1,3-acetone-dicarboxylic acid | 1:1 | | | precipitates |

Referring to the results shown in Table 2, while precipitates were not formed in the composition including ornithine and citric acid, precipitates were formed in the compositions including the other organic acids and ornithine making evaluation of adhesion impossible. That is, in the case where compositions were prepared by mixing ornithine and various organic acids, it was confirmed that not all of the compositions have adhesiveness without forming precipitates.

Example 2: Evaluation of Solubility According to Solvent of Composition

Adhesive compositions including ornithine and citric acid were prepared in the same manner as in Example 1 (molar ratio of ornithine to citric acid=1:1 and solid content: 50 parts by weight). 25 g of an additional solvent shown in Table 3 below was added to 50 g of each of the prepared adhesive compositions and the mixture was stirred for 1 hour. After stirring, solubility of the adhesive composition to each solvent was identified. Types of the added solvent and evaluation results of solubility of the adhesive composition to each solvent are shown in Table 3 below.

TABLE 3

| No. | Additional solvent | Dissolution result |
|---|---|---|
| 2-1 | methanol | dissolved |
| 2-2 | toluene | not dissolved |
| 2-3 | benzene | not dissolved |
| 2-4 | chloroform | not dissolved |
| 2-5 | methylene chloride | not dissolved |
| 2-6 | dichloromethane | not dissolved |
| 2-7 | tetrahydrofuran (THF) | not dissolved |
| 2-8 | ethyl acetate | not dissolved |
| 2-9 | dimethyl formamide (DMF) | not dissolved |
| 2-10 | dimethylsulfoxide (DMSO) | not dissolved |
| 2-11 | n-hexane | not dissolved |

Referring to Table 3, the adhesive composition according to the present disclosure was dissolved in an alcohol such as methanol used as a solvent, but not dissolved in the other organic solvents.

Example 3: Analysis of State, Viscosity, and Initial Tack of Adhesive Composition According to Mixing Molar Ratio of Ornithine to Citric Acid Stability, viscosity, and initial tack of adhesive compositions of the present disclosure according to the molar ratio of ornithine to citric acid included in the adhesive compositions were analyzed.

Adhesive compositions including ornithine and citric acid were prepared in the same manner as in Example 1, except that molar ratios of ornithine to citric acid were adjusted to 3:1, 2.5:1, 2:1, 1.5:1, 1:1, 1:1.5, 1:2, 1:2.5, and 1:3, respectively (where the solid content was 50 parts by weight).

(1) Evaluation of Stability

Stability of the adhesive compositions having various molar ratios was evaluated according to the following method. About 1 g of each of the adhesive compositions was applied to an aluminum dish having a diameter of 5 cm. Then, formation of precipitates was identified in the adhesive composition under the following drying conditions.

i) Drying Conditions 1

The adhesive compositions were maintained at room temperature (25° C.) at a relative humidity of 60±10% for 14 days to identify formation of precipitates and surface changes thereof.

ii) Drying Conditions 2

The adhesive compositions were maintained in an oven at 40° C. for 48 hours to identify formation of precipitates and surface changes thereof.

(2) Evaluation of Viscosity

Viscosity was measured using a rotary viscometer (Manufacturer: LAMYRHEOLOGY, Product Name: RM200 TOUCH CP400 or RM200 TOUCH) at 25±1° C. using a LV-1 spindle at 60 rpm.

(3) Evaluation of Initial Tack

Initial tacks of the adhesive compositions in which precipitates were not formed in the evaluation of stability were evaluated. Initial tacks of the adhesive compositions were measured by a rheometer of Anton Paar, Co. Ltd., and compared using the rheometer. A SUS probe having a diameter of 25 mm was brought into contact with each adhesive composition for 1 minute to maintain a gap of 0.01 mm, and then a force generated to separate the probe at the same speed was measured to quantitatively evaluate an instantaneous initial tack. Evaluation results are shown in Table 4 below.

TABLE 4

| No. | Ornithine:CA (molar ratio) | Solid content (parts by weight) | Viscosity (mPa · s) | Initialtack (mJ) | State |
|---|---|---|---|---|---|
| 3-1 | 3:1 | 50 | 41.58 | — | precipitates |
| 3-2 | 2.5:1 | | 37.11 | — | precipitates |
| 3-3 | 2:1 | | 34.89 | — | precipitates |
| 3-4 | 1.5:1 | | 32.52 | 0.314 | liquid state |
| 3-5 | 1:1 | | 30.63 | 0.295 | liquid state |
| 3-6 | 1:1.5 | | 29.5 | 0.274 | liquid state |
| 3-7 | 1:2 | | 28.69 | 0.252 | liquid state |
| 3-8 | 1:2.5 | | 26.48 | 0.239 | liquid state |
| 3-9 | 1:3 | | 24.25 | 0.228 | liquid state |

Referring to Table 4, precipitates were formed in the adhesive compositions in which the molar ratio of ornithine to citric acid was in the range of 3:1 to 2:1.

While precipitates were formed in the adhesive composition when the molar ratio of ornithine to citric acid was 2:1, precipitates were not formed in the adhesive composition when the molar ratio of ornithine to citric acid was 1.5:1.

To identify a more specific critical point, adhesive compositions were prepared by subdividing the molar ratio of ornithine to citric acid into 2.0:1, 1.9:1, 1.8:1, 1.7:1, 1.6:1, and 1.5:1 (where the solid content was 50 parts by weight). Then, stability, viscosity, and initial tack thereof were evaluated in the same manner.

Evaluation results are shown in Table 5 below.

TABLE 5

| No. | Ornithine:CA (molar ratio) | Solid content (wt %) | Viscosity (mPa · s) | Initial tack (mJ) | State |
|---|---|---|---|---|---|
| 3-10 | 2.0:1 | 50 | 35.02 | — | precipitates |
| 3-11 | 1.9:1 | | 34.6 | — | precipitates |
| 3-12 | 1.8:1 | | 33.35 | 0.387 | liquid state |
| 3-13 | 1.7:1 | | 33.1 | 0.363 | liquid state |
| 3-14 | 1.6:1 | | 32.49 | 0.338 | liquid state |
| 3-15 | 1.5:1 | | 31.98 | 0.311 | liquid state |

Referring to Table 5, while precipitates were formed when the molar ratio of ornithine to citric acid was 1.9:1 to 2:1, precipitates were not formed when the molar ratio of ornithine to citric acid was in the range of 1.8:1 to 1.5:1

Example 4: Analysis of State, Viscosity, and Initial Tack of Adhesive Composition According to Solid Content State, viscosity, and initial tack of the adhesive compositions of the present disclosure according to the solid content were analyzed.

1) Evaluation According to Solid Content at a Molar Ratio of Ornithine to Citric Acid of 1:1

Adhesive compositions including ornithine and citric acid were prepared in the same manner as in Example 1, except that solid contents in the adhesive compositions were adjusted to 10 wt %, 20 wt %, 30 wt %, 40 wt %, 50 wt %, 60 wt %, 70 wt %, and 75 wt %, respectively (where the molar ratio of ornithine to citric acid was 1:1). The solid content was adjusted by controlling the content of water.

States, viscosity, and initial tack of the compositions were evaluated in the same manner as in Example 3. Evaluation results are shown in Table 6 below.

TABLE 6

| No. | Ornithine:CA (molar ratio) | Solid content (wt %) | Viscosity (mPa · s) | Initial tack (mJ) | State |
|---|---|---|---|---|---|
| 4-1 | 1:1 | 10 | 11.53 | 0.221 | liquid state |
| 4-2 | 1:1 | 20 | 12.48 | 0.232 | liquid state |
| 4-3 | 1:1 | 30 | 15.97 | 0.245 | liquid state |
| 4-4 | 1:1 | 40 | 23.56 | 0.257 | liquid state |
| 4-5 | 1:1 | 50 | 30.63 | 0.291 | liquid state |
| 4-6 | 1:1 | 60 | 92.21 | 0.558 | liquid state |
| 4-7 | 1:1 | 70 | 742.1 | 1.52 | liquid state |
| 4-8 | 1:1 | 75 | — | — | precipitates |

Referring to Table 6, precipitates were not formed in the adhesive composition when the solid content was in the range of 10 wt % to 70 wt %. To identify a more specific critical point, adhesive compositions were prepared by subdividing the solid content into 65 wt %, 66 wt %, 67 wt %, 68 wt %, 69 wt %, 70 wt %, 71 wt %, 72 wt %, 73 wt %, 74 wt %, 75 wt %, and 76 wt % in the adhesive compositions (where the molar ratio of ornithine to citric acid was 1:1). Then, stability, viscosity, and initial tack thereof were evaluated in the same manner.

Evaluation results are shown in Table 7 below.

TABLE 7

| No. | Ornithine:CA (molar ratio) | Solid content (wt %) | Viscosity (mPa · s) | Initial tack (mJ) | State |
|---|---|---|---|---|---|
| 4-9 | 1:1 | 60 | 93.55 | 0.561 | liquid state |
| 4-10 | 1:1 | 61 | 102.42 | 0.632 | liquid state |
| 4-11 | 1:1 | 62 | 120.63 | 0.687 | liquid state |
| 4-12 | 1:1 | 63 | 138.61 | 0.739 | liquid state |
| 4-13 | 1:1 | 64 | 150.22 | 0.799 | liquid state |
| 4-14 | 1:1 | 65 | 184.2 | 0.824 | liquid state |
| 4-15 | 1:1 | 66 | 215.62 | 0.898 | liquid state |
| 4-16 | 1:1 | 67 | 256.81 | 0.995 | liquid state |
| 4-17 | 1:1 | 68 | 310.35 | 1.13 | liquid state |
| 4-18 | 1:1 | 69 | 468.12 | 1.34 | liquid state |
| 4-19 | 1:1 | 70 | 742.52 | 1.55 | liquid state |
| 4-20 | 1:1 | 71 | — | — | precipitates |

Referring to Table 7, while the adhesive compositions were maintained in liquid states when the solid content was in the range of 65 wt % to 70 wt % in the adhesive composition, precipitates were formed within two weeks when the solid content was 71 wt % or greater in the adhesive composition.

2) Evaluation according to solid content at a molar ratio of ornithine to citric acid of 1:2, 1:3, or 2:1

Formation of precipitates according to the solid content was evaluated while changing the molar ratio of ornithine to citric acid.

Adhesive compositions including ornithine and citric acid were prepared in the same manner as in Example 1, except that the molar ratios of ornithine to citric acid were adjusted to 1:2, 1:3, and 2:1, respectively. The content of water was adjusted such that the solid contents were 10 wt %, 20 wt %, 30 wt %, 40 wt %, 50 wt %, 60 wt %, and 70 wt %, respectively in the compositions having each molar ratio. Stability of the compositions was evaluated in the same manner as in Example 1. Evaluation results are shown in Table 8 below.

TABLE 8

| No. | Ornithine:CA (molar ratio) | Solid content (wt %) | Viscosity (mPa · s) | Initial tack (mJ) | State |
|---|---|---|---|---|---|
| 4-21 | 1:2 | 10 | 11.35 | 0.193 | liquid state |
| 4-22 | | 20 | 12.21 | 0.212 | liquid state |
| 4-23 | | 30 | 14.95 | 0.231 | liquid state |
| 4-24 | | 40 | 22.63 | 0.246 | liquid state |
| 4-25 | | 50 | 29.11 | 0.256 | liquid state |
| 4-26 | | 60 | 89.53 | 0.51 | liquid state |
| 4-27 | | 70 | 580.2 | 1.32 | liquid state |
| 4-28 | 1:3 | 10 | 10.58 | 0.192 | liquid state |
| 4-29 | | 20 | 12.87 | 0.207 | liquid state |
| 4-30 | | 30 | 14.58 | 0.224 | liquid state |
| 4-31 | | 40 | 22.68 | 0.228 | liquid state |
| 4-32 | | 50 | 25.1 | 0.235 | liquid state |
| 4-33 | | 60 | 86.32 | 0.481 | liquid state |
| 4-34 | | 70 | 436.5 | 1.11 | liquid state |
| 4-35 | 2:1 | 10 | 12.51 | — | precipitates |
| 4-36 | | 20 | 13.45 | — | precipitates |
| 4-37 | | 30 | 17.65 | — | precipitates |
| 4-38 | | 40 | 27.32 | — | precipitates |
| 4-39 | | 50 | 34.89 | — | precipitates |
| 4-40 | | 60 | 101.63 | — | precipitates |
| 4-41 | | 70 | 810.1 | — | precipitates |

Referring to Table 8, when the molar ratios of ornithine to citric acid were 1:2 and 1:3, precipitates were not formed although the solid contents vary from 10 wt % to 70 wt %. However, precipitates were formed regardless of the solid content when the molar ratio of ornithine to citric acid was 2:1.

That is, it may be confirmed that the molar ratio of ornithine to citric acid is the most important factor affecting stability and adhesive force of the adhesive composition according to the present disclosure. At the same molar ratio of the ornithine to citric acid, stability and adhesive force of the adhesive composition is affected by the solid content.

Example 5: Comparison of Initial Tack and Water Removability

Adhesive forces and water removability were compared between a conventional adhesive and the adhesive composition according to the present disclosure.

An adhesive composition including ornithine and citric acid was prepared in the same manner as in Example 1, except that the solid content was adjusted to 10 wt % in the adhesive composition by adjusting the content of water (where the molar ratio of ornithine to citric acid was 1:1).

A commercially available polyvinyl alcohol-based adhesive (PVA 088-50, manufactured by Qingdao Sanhuan Colorchem CO. LTD.) was prepared and the solid content was adjusted to 10 wt % by controlling the content of water to prepare an adhesive composition (hereinafter, referred to as Control 1).

Viscosity and initial tack of the adhesive composition according to the present disclosure (solid content: 10 wt %) and Control 1 were evaluated in the same manner as in Example 3.

Water removability of the adhesive composition according to the present disclosure (solid content 10 wt %) and Control 1 was evaluated. Water removability was evaluated according to the following method. The adhesive composition according to the present disclosure was applied to a PET film to a thickness of 50 to 60 μm and dried at 40° C. for 30 minutes. The dried resultant was cut to a size of 25 mm×25 mm and attached to a stainless steel (SUS304) by pressing five times with a pressure of 2 kgf using a hand roller to prepare samples. The PVA adhesive was applied to a PET film to a thickness of 50 to 60 μm, cut to a size of 25 mm×25 mm, attached to a stainless steel (SUS304) by pressing five times with a pressure of 2 kgf using a hand roller to prepare a sample.

Each of the samples was completely immersed in distilled water (DIW) at room temperature, atmospheric pressure, and a neutral pH and stirred at 200 rpm using a stirrer. States of the samples were identified i) after 1 hour or ii) after 24 hours. Then, water removability of the samples was evaluated by measuring periods of time during which the adhesive composition or adhesive was completely removed from the substrate. Evaluation results are shown in Table 9 below.

TABLE 9

| | Solid content (wt %) | Viscosity (mPa · s) | Initial tack (mJ) | Water removability |
|---|---|---|---|---|
| 5-1 | 10 | 11.53 | 0.221 | Separated within 1 hour |
| Control 1 (PVA-based) | 10 | 43.49 | 0.201 | i) partially dissolved in water after 1 hour or ii) dissolved in water after 24 hours, at 200 rpm. |

Referring to Table 9, the adhesive composition according to the present disclosure exhibited initial tack equal to or greater than that of the PVA-based adhesive composition (Control 1) and was quickly separated in water in comparison therewith. On the contrary, the PVA-based adhesive composition was dissolved in water after 24 hours but partially dissolved in water after 1 hour.

That is, the adhesive composition according to the present disclosure has a similar or stronger adhesive force and far better water removability than the conventional adhesive, and thus it is expected to utilize the adhesive composition according to the present disclosure in various fields.

Example 6: Evaluation of Initial Tack and Water Removability According to Solvent Adhesive compositions including ornithine and citric acid were prepared in the same manner as in Example 1 (6-1 to 6-3 below), except that the molar ratios of ornithine to citric acid were adjusted to 1.5:1, 1:1, and 1:1.5, respectively (where the solid content was 50 parts by weight).

Adhesive compositions including ornithine and citric acid were further prepared in the same manner as in Example 1 (6-4 to 6-6 below), except that the molar ratios of ornithine to citric acid were adjusted to 1.5:1, 1:1, and 1:1.5, respectively, and a mixed solvent of deionized water and methanol in a weight ratio of 1:1 was used (where the solid content was 50 parts by weight).

As a control, a commercially available acrylic adhesive (K901, Hansung P&I, hereinafter, referred to as Control 2, where the solid content was 59 wt %) was prepared. Peel strength and water removability of each of the adhesive compositions were evaluated according to the following methods, and evaluation results are shown in Table 10 below.

1) Water Removability

Each of the prepared adhesive compositions according to the present disclosure and Control 2 was applied to the PET film to a thickness of 50 to 60 μm and dried at 40° C. for 30 minutes.

Dried resultants were cut to a size of 25 mm×25 mm and attached to a stainless steel (SUS304) by pressing five times with a pressure of 2 kgf using a hand roller to prepare samples.

Each of the samples was completely immersed in distilled water (DIW) at room temperature, atmospheric pressure, and a neutral pH and stirred at 200 rpm by using a stirrer. States of the samples were identified i) after 1 hour or ii) after 24 hours.

TABLE 10

| No. | Ornithine:CA (molar ratio) | Solvent | Solid content (parts by weight) | Viscosity (mPa · s) | Initial tack (mJ) | State | Water removability |
|---|---|---|---|---|---|---|---|
| 6-1 | 1.5:1 | DIW | 50 | 32.68 | 0.322 | liquid state | completely dissolved in water i) after 1 hour or ii) after 24 hours, at 200 rpm |
| 6-2 | 1:1 | | | 30.45 | 0.289 | liquid state | |
| 6-3 | 1:1.5 | | | 28.94 | 0.271 | liquid state | |
| 6-4 | 1.5:1 | DIW and methanol (1.1 wt ratio) | | 41.66 | 0.974 | liquid state | |
| 6-5 | 1:1 | | | 39.25 | 0.848 | liquid state | |
| 6-6 | 1:1.5 | | | 36.42 | 0.642 | liquid state | |
| 6-7 | 1:1 | DIW and methanol (6:4 wt ratio) | | 37.52 | 0.796 | liquid state | |

TABLE 10-continued

| No. | Orni-thine:CA (molar ratio) | Solvent | Solid content (parts by weight) | Viscosity (mPa·s) | Initial tack (mJ) | State | Water removability |
|---|---|---|---|---|---|---|---|
| 6-8 | 1:1 | DIW and methanol (4:6 wt ratio) |  | 40.11 | 0.899 | liquid state |  |
| Control 2 (acrylic) | — | | 59 | 248.9 | 0.292 | — | not dissolved in water |

Referring to Table 10, an adhesive product obtained by using the adhesive composition according to the present disclosure was separated within 1 hour after being immersed in water. In addition, it was confirmed that initial tack was further increased when an alcohol and water were used as solvents. These results may be obtained because the adhesive composition including a mixed solvent has a lower contact angle than that including only deionized water, thereby having superior coating properties on a substrate. The adhesive composition according to the present disclosure exhibited similar initial tack even with a lower solid content in comparison with the conventional acrylic adhesive (Control 2). However, the acrylic adhesive was not dissolved in water even after 24 hours.

Example 7: Composition Analysis of Adhesive Composition According to Reaction Time and Temperature Composition ratios of adhesive compositions according to reaction time and temperature were analyzed.

1) Preparation at 80° C.: 86.5 g of DIW was added to 100 g of a 54 wt % aqueous solution of ornithine free form and the mixture was stirred at room temperature (25° C., T1) for 30 minutes. The diluted resultant was stirred while adding 78.50 g of citric acid thereto at 80° C. (T2) for 12 hours to prepare an adhesive composition (solid content: 50 wt % and mixing molar ratio of ornithine to citric acid=1:1). Composition analysis was performed on the adhesive composition at every 3 hours.

2) Preparation at 60° C.: An adhesive composition was prepared in the same manner as in the above method 1), except that the T2 was changed to 60° C. Composition analysis was performed on the adhesive composition at every 3 hours.

3) Preparation at 40° C.: An adhesive composition was prepared in the same manner as in the above method 1), except that the T2 was changed to 40° C. Composition analysis was performed on the adhesive composition at every 3 hours.

Composition analysis was performed on the prepared compositions by HPLC.

Analysis results are shown in Table 11 below.

TABLE 11

| Temperature | Reaction time (hr) | Ornithine (wt %) | Citric acid (wt %) |
|---|---|---|---|
| 80° C. | 0 | 19.89 | 29.15 |
|  | 3 | 18.79 | 29.05 |
|  | 6 | 18.51 | 27.51 |
|  | 9 | 16.24 | 26.59 |
|  | 12 | 14.81 | 25.36 |
| 60° C. | 0 | 20.28 | 29.68 |
|  | 3 | 20.34 | 29.54 |
|  | 6 | 20.31 | 29.45 |
|  | 9 | 20.41 | 29.34 |
|  | 12 | 20.36 | 29.11 |
| 40° C. | 0 | 20.47 | 29.53 |
|  | 3 | 20.29 | 29.47 |
|  | 6 | 20.33 | 29.35 |
|  | 9 | 20.31 | 29.47 |
|  | 12 | 20.22 | 29.35 |

Referring to Table 11, it was confirmed that the amount of the composition decreased when the composition was prepared at 80° C. Thus, it was confirmed that side reactions occur at 80° C. It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the FIGURES, it will be understood by those of ordinary skill in the art that various changes in form and details may be made therein without departing from the spirit and scope of the disclosure as defined by the following claims.

What is claimed is:

1. An adhesive composition in combination with substrates, the adhesive composition comprising:
ornithine, citric acid, and water,
wherein the ornithine and the citric acid are present in the form of an aqueous salt solution, wherein the aqueous salt solution does not form a precipitate when stored for 14 days or more at a temperature of −18° C. to 80° C.,
wherein the mixing molar ratio of the ornithine to the citric acid is in the range of 1.8:1 to 1:3, and the solid content in the adhesive composition is 10 parts by weight to 70 parts by weight based on 100 parts by weight of the adhesive composition, and
wherein the adhesive composition is present between a first substrate and a second substrate.

2. The adhesive composition in combination with the substrates of claim 1, wherein
the mixing molar ratio of the ornithine to the citric acid is in the range of 1.5:1 to 1:3.

3. The adhesive composition in combination with the substrates of claim 1, wherein
the sum of the contents of ornithine and citric acid is in the range of 60 parts by weight to 100 parts by weight based on 100 parts by weight of the solid content in the adhesive composition.

4. The adhesive composition in combination with the substrates of claim 1, wherein the adhesive composition further comprises
at least one alcohol selected from a primary alcohol, a polyhydric alcohol, an unsaturated aliphatic alcohol, or an alicyclic alcohol.

5. The adhesive composition of in combination with the substrates claim 4, wherein
the alcohol comprises at least one of:
a monohydric alcohol selected from methanol, ethanol, propane-2-ol, butane-1-ol, pentane-1-ol, and hexadecane-1-ol;

a polyhydric alcohol selected from ethane-1,2-diol, propane-1,2-diol, propane-1,2,3-triol, butane-1,3-diol, butane-1,2,3,4-tetraol, pentane-1,2,3,4,5-pentol, hexane-1,2,3,4,5,6-hexol, and heptane-1,2,3,4,5,6,7-heptol;

an unsaturated aliphatic alcohol selected from prop-2-en-1-ol, 3,7-dimethylocta-2,6-dien-1-ol, and prop-2-yn-1-ol; or an alicyclic alcohol selected from cyclohexane-1,2,3,4,5,6-hexol and 2-(2-propyl)-5-methylcyclohexane-1-ol.

6. The adhesive composition in combination with the substrates of claim 1, wherein the precipitate of ornithine and citric acid does not form when stored for 12 months at a temperature of −18° C. to 80° C.

7. The adhesive composition in combination with the substrates of claim 1, wherein the adhesive composition further comprises at least one of itaconic acid, oxaloacetic acid, alpha-ketoglutaric acid, or malic acid, in an amount of 0.1 parts by weight to 10 parts by weight, based on 100 parts by weight of citric acid.

8. The adhesive composition in combination with the substrates of claim 1, wherein the adhesive composition further comprises at least one alcohol selected from a primary alcohol, a polyhydric alcohol, an unsaturated aliphatic alcohol, or an alicyclic alcohol, and a weight ratio of the water to the alcohol is in a range from 1:1 to 3:2.

9. The adhesive composition in combination with the substrates of claim 1, wherein the first substrate and the second substrate are independently selected from the group consisting of glass, a polymer film, a metal, plastic, paper, and fiber.

10. The adhesive composition in combination with the substrates of claim 1, wherein at least one of the first or the second substrate includes an uneven surface.

11. The adhesive composition in combination with the substrates of claim 1, wherein at least one of the first or the second substrate includes a surface that is hydrophilically treated.

12. The adhesive composition in combination with the substrates of claim 4, wherein the mixing weight ratio of the water to the alcohol in the adhesive composition is in a range of 1:1 to 5:1.

* * * * *